United States Patent
Favero et al.

(10) Patent No.: US 9,249,352 B2
(45) Date of Patent: Feb. 2, 2016

(54) AQUEOUS FRACTURING FLUID COMPOSITION AND FRACTURING PROCESS USING THE COMPOSITION

(71) Applicant: S.P.C.M. SA, Andrezieux Boutheon (FR)

(72) Inventors: Cédrick Favero, Saint Romain Le Puy (FR); Nicolas Gaillard, Saint-Etienne (FR)

(73) Assignee: S.P.C.M. SA, Andrezieux Boutheon (FR)

( * ) Notice: Subject to any disclaimer, the term of this patent is extended or adjusted under 35 U.S.C. 154(b) by 398 days.

(21) Appl. No.: 13/838,858

(22) Filed: Mar. 15, 2013

(65) Prior Publication Data

US 2013/0255954 A1 Oct. 3, 2013

Related U.S. Application Data

(60) Provisional application No. 61/635,534, filed on Apr. 19, 2012.

(30) Foreign Application Priority Data

Apr. 3, 2012 (FR) ..................... 12 53029

(51) Int. Cl.
*C09K 8/68* (2006.01)
*E21B 43/26* (2006.01)
*C09K 8/80* (2006.01)
*C09K 8/88* (2006.01)

(52) U.S. Cl.
CPC ... *C09K 8/68* (2013.01); *C09K 8/80* (2013.01); *C09K 8/882* (2013.01); *E21B 43/26* (2013.01)

(58) Field of Classification Search
None
See application file for complete search history.

(56) References Cited

U.S. PATENT DOCUMENTS

| | | | |
|---|---|---|---|
| 7,205,262 B2 * | 4/2007 | Schwartz | B08B 9/0555 137/13 |
| 2007/0287815 A1 | 12/2007 | Gaillard et al. | |
| 2012/0058922 A1 | 3/2012 | Favero et al. | |

FOREIGN PATENT DOCUMENTS

| | | |
|---|---|---|
| FR | 2 945 542 A1 | 11/2010 |
| WO | 02/084075 A1 | 10/2002 |
| WO | 2005/100423 A1 | 10/2005 |

OTHER PUBLICATIONS

French Search Report and Written Opinion for French priority application FR 1350823 dated Dec. 12, 2012.

* cited by examiner

*Primary Examiner* — John J Figureoa
(74) *Attorney, Agent, or Firm* — Heslin Rothenberg Farley & Mesiti P.C.

(57) ABSTRACT

Fracturing fluid comprising, in solution in water, a proppant and an associative amphoteric polymer, the said polymer having a molecular weight of at least 1 000 000 g/mol and comprising:
  0.01 to 10 mol % of at least one cationic monomer derived from acrylamide,
  from 0.09 to 89.99 mol % of at least one anionic monomer,
  and from 10 to 99 mol % of at least one nonionic water-soluble monomer.
Fracturing process using the fluid.

20 Claims, 4 Drawing Sheets

Figure 1: Impact of viscosity versus shear rate of different polymers at 20°C in seawater (30g/l of NaCl, 3g/l of CaCl$_2$,2H$_2$O).

*Figure 2: Impact of viscosity versus shear rate of different polymers at 50°C in seawater (30g/l of NaCl, 3g/l of CaCl$_2$,2H$_2$O).*

Figure 3: Impact of viscosity versus shear rate of different polymers in high salinity brine. Comparison between different guar gums.

*Figure 4: Impact of viscosity versus shear rate of different polymers for different salinities.*

AQUEOUS FRACTURING FLUID COMPOSITION AND FRACTURING PROCESS USING THE COMPOSITION

CROSS REFERENCE TO RELATED APPLICATIONS

This application is a U.S. national application filed under 35 U.S.C. §111(a), and claims priority to U.S. Provisional Application No. 61/635,534, filed on Apr. 19, 2012, and to French priority document FR1253029, filed on Apr. 3, 2012. The entire disclosures of each of the priority applications are hereby incorporated herein by reference.

The invention relates to a novel fracturing fluid composition. More specifically, the invention relates to a novel aqueous fracturing fluid composition comprising at least one proppant and an associative amphoteric copolymer of high molecular weight.

The invention also relates to a novel process for fracturing unconventional oil and gas reservoirs using the said composition.

The production of oil and gas contained in unconventional reservoirs has increased in recent years and requires the opening of fractures in the reservoir for the economic production of the petroleum and gas.

The term "unconventional reservoirs" denotes deposits that require particular extraction techniques since they do not exist in the form of an accumulation in a porous, permeable rock (*cf Les hydrocarbures de roche-mère en France Rapport provisoire—CGIET no* 2011-04-*G—Ministère de l'ecologie, du dèveloppement durable, des transports et du logement—*Avril 2011 [*Source rock hydrocarbons in France, interim report—CGIET No.* 2011-04-*G—Ministry of ecology, sustainable development, transportation and housing—*April 2011]). For unconventional gas, mention may be made of shale gas, coal gas (coal bed methane) or compact reservoir gas (tight gas). For unconventional oil, mention may be made of heavy oil, shale oil or tight oil.

The reserves contained in unconventional reservoirs are enormous and extremely widespread in regions that were previously unexploited, for instance hydrocarbons such as shale gas, tight gas and coal bed gas. In the United States, shale gases are widely exploited and at the present time represent 46% of the total natural gas produced in the USA, whereas it represented only 28% in 1998. The very widespread basins are known under the names Barnett Shale, Ville Fayette Shale, Mowry Shale, Marcellus Shale, Utica Shale, etc. Exploitation of compact reservoirs was made possible by an evolution in drilling techniques.

Indeed, production techniques have evolved from vertical wells to horizontal wells, reducing the number of production wells necessary and their footprint on the land, and affording better coverage of the volume of the reservoir in order to recover a maximum amount of gas. However, the reservoir permeabilities are insufficient for the gas to migrate from the source rock to the well easily, and thus to enable the gas or petroleum to be produced economically and in quantity. It is thus necessary to increase the permeability and the production surfaces via stimulation operations and in particular via hydraulic fracturing of the rock in contact with the well.

Hydraulic Fracturing

The purpose of hydraulic fracturing is to create additional permeability and to enlarge the gas or petroleum production areas. Specifically, low permeability, natural barriers of compact layers and impermeabilization by drilling operations greatly limit production. The gas or oil contained in an unconventional reservoir cannot easily migrate from the rock to the well without stimulation.

These hydraulic fracturing operations using horizontal wells began in 1960 in the Appalachians. Today several thousands of operations have been performed in the USA.

Reservoir modelling, drilling, cementation and stimulation techniques have become increasingly sophisticated and use equipment that makes it possible to perform these operations over increasingly shorter times with precise analysis of the results.

Reservoir Stimulation by Hydraulic Fracturing

These operations consist in injecting water at high pressure and at very high flow rate so as to create fractures distributed perpendicularly to the production wells. The process is generally performed in several steps in order to create fractures along the entire length of the horizontal well, allowing to cover a maximum volume of the reservoir.

In order to keep these fractures open, a proppant is added (sand, plastics or calibrated ceramics) so as to prevent closure of these fractures and to maintain the capillarity created once the injection is stopped.

Water alone is not sufficient to obtain good efficacy of placement of the proppant, due to its low viscosity. This limits its capacity to keep the proppant in place in the fractures. To overcome this problem, fracturing fluids containing viscosifying compounds have been developed.

By definition, a compound will be said to be viscosifying when it increases the viscosity of the solutions in which it is dissolved. Water soluble polymers can be used as viscosifying compound.

In addition to having viscosifying properties, the compound must have a particular rheological profile. Specifically, the polymer must have a low viscosity at high shear rate so as not to impede the transportation and the pumping of the fluid containing the proppant during the injection of the fracturing fluid. Once injected, this same compound must be able to generate a sufficient viscosity when the shear decreases in order to support the proppant so as to keep it in the fractures.

The polymer must thus give the solution shear-thinning properties in order to have a relatively low viscosity during injection (at high shear) and a high viscosity when the shear decreases so as to keep the proppant in suspension in the fractures.

The viscoelastic properties of polymers in solution must also be taken into consideration. This viscoelasticity, and its importance in the application, is described in SPE 147206 (*Fracturing Fluid Comprised of Components Sourced Solely from the Food Industry Provides Superior Proppant Transport*—David Loveless, Jeremy Holtsclaw, Rajesh Saini, Phil Harris, and Jeff Fleming, SPE, Halliburton) via visual observations in static or dynamic experiments, or alternatively via rheological measurements, such as the measurement of the storage modulus and the loss modulus (G' and G"), or measurement on a rheometer of the viscosity as a function of the shear rate. Thus, elastic properties will be advantageous for ensuring the transportation and the suspension of the fracture proppant.

The choice of polymer is therefore not obvious and requires an in-depth rheological study in order to obtain satisfactory results.

Among the viscosifying compounds for aqueous solutions belonging to the prior art, mention may be made of natural substances such as guar gums and derivatives thereof such as hydroxypropyl guar (HPG) or carboxymethylhydroxypropyl guar (CMHPG); cellulose derivatives such as carboxymethylcellulose or hydroxyethyl cellulose. These compounds are especially described in U.S. Pat. No. 4,033,415, U.S. Pat. No. 3,888,312 and U.S. Pat. No. 4,801,389. In SPE 152596 (*Hydraulic Fracturing* 101: *What Every Representative, Environmentalist, Regulator, Reporter, Investor, University Researcher, Neighbor and Engineer Should Know About Estimating Frac Risk and Improving Frac Performance in Unconventional Gas and Oil Wells*—George E. King, Apache Corporation), the latest advances relating to the performance of fracturing fluids are discussed in detail.

However, these natural substances, and in particular guar derivatives, are also useful in other applications, such as the food or textile industry, and the growth in the exploitation of unconventional oil and gas resources is in competition with these other applications. This creates pressure on the availability of these products and leads to price problems.

Other petrochemistry-based compounds may have viscosifying properties. Mention may be made of synthetic polymers. Poly(meth)acrylamides, optionally partially hydrolysed, and poly(meth)acrylates and copolymers thereof are particularly known. These polymers develop viscosity thanks to of their molar mass and the inter-chain ionic repulsions. These polymers are described in patents GB 951 147, U.S. Pat. No. 3,727,689, U.S. Pat. No. 3,841,402 or U.S. Pat. No. 3,938,594. The mechanism governing the viscosity is linked to an increase in the hydrodynamic volume through intra-chain repulsions, inter-chain entanglements, etc.

However, in the presence of high salinity or at a high temperature, these polymers do not develop strong entanglements and repulsions, which is reflected by a strong decrease in their viscosity, especially after having undergone the shear of the pumping step. Moreover, these polymers generally do not have viscosifying properties that are sufficient to support the proppant in the fracture. The dose of these polymers needs to be increased to levels that are too high to obtain the suspension properties for the proppant. The dosage levels are not economically viable.

In order to improve the performance of the synthetic polymers mentioned previously, they were modified by introducing hydrophobic groups. The polymers thus obtained (comprising in minor amounts apolar units and in major amount units of hydrophilic nature) have associative properties. They require a high molecular mass and are characterized in that during their dissolution, their hydrophobic groups associate so as to limit the interactions with water. The drop in viscosity linked to the presence of electrolytes or high temperatures, which is a source of reduction of the hydrodynamic volume, is compensated by the increase of the inter-chain attractive interactions.

For the purpose of increasing these interactions, the polymers are favourably mixed with other compounds.

Most of the prior art documents describe the combination of associative polymer with surfactants in order to reinforce the inter-chain apolar associations or, on the contrary, to dissociate them by stabilization in order to promote intra-chain interactions.

In U.S. Pat. No. 4,432,881, a composition comprising a nonionic surfactant and a copolymer is claimed. The copolymer may be ionic or nonionic and comprises a monomer comprising a hydrophobic side chain, of at least 8 carbons.

More recently, patent application WO 02/102917 describes a thickening aqueous composition comprising one or more polymers formed:
from a nonionic monomer,
from an anionic monomer,
from a hydrophobic monomer.
The number of monomers composing the polymer is not limited. It is clearly explained that two monomers cannot have an opposite ionic charge, which means that the polymer is not amphoteric. In addition, one of the essential characteristics of the composition is that it provides thickening effect under a high shear rate and vice versa, which is contrary to the object of the present invention.

The Applicant has developed a novel aqueous fracturing fluid composition comprising, in solution in water, a proppant and an associative amphoteric polymer, the polymer having a molecular weight of at least 1 000 000 g/mol, and comprising:
0.01 to 10 mol % of at least one acrylamide-derived cationic monomer containing a hydrophobic chain and of general formula (I):

in which:
R1, R2: independently, a hydrogen, $CH_3$, $CH_2COOH$, COOH, $CH_2COOR_7$ $COOR_7$, $CH_2CONR_7R_8$, $CONR_7R_8$
R3, R4, R5: independently, a hydrogen, $CH_3$, $C_2H_5$
R6: an alkyl or arylalkyl chain comprising from 8 to 30 carbons
Q: an alkyl chain comprising from 1 to 8 carbons
Z: oxygen or $NR_7$
R7, R8; independently, a hydrogen, an alkyl chain comprising from 1 to 8 carbons
X: a halide chosen from the group comprising bromide, chloride, iodide, fluoride, or a counterion of negative charge,
from 0.09 to 89.99 mol % of at least one anionic monomer. The anionic monomers that are useful in the present invention may be chosen from a broad group. These monomers may present acrylic, vinyl, maleic, fumaric or allylic functionalities and may contain a carboxylate, phosphonate, phosphate, sulfate or sulfonate group or another anionically charged group. The monomer may be acidic or may be in the form of a salt or of the corresponding alkaline-earth metal or alkali metal of such a monomer. Examples of suitable monomers include acrylic acid, methacrylic acid, itaconic acid, crotonic acid, maleic acid, fumaric acid and monomers of strong acid type bearing, for example, a function of sulfonic acid or phosphonic acid type such as 2-acrylamido-2-methylpropanesulfonic acid, vinylsulfonic acid, vinylphosphonic acid, allylsulfonic acid, allylphosphonic acid, styrenesulfonic acid and the water-soluble alkali metal, alkaline-earth metal and ammonium salts thereof;
and from 10 to 99 mol % of at least one nonionic water-soluble monomer. The nonionic monomers that are useful according to the invention may be chosen from the group comprising water-soluble vinyl monomers. Preferred monomers belonging to this category are advantageously chosen from the group comprising acrylamide and methacrylamide, N-isopropylacrylamide, N,N-dimethylacrylamide, N-tert-butylacrylamide. N-Vinylformamide, N-vinylacetamide, N-vinylpyridine and/or N-vinylpyrrolidone, acryloylmorpholine and acryloylpyrrolidone may also be used. Mention may also be made of alkyl-polyethylene glycol methacrylates. A preferred nonionic monomer will be acrylamide.

In one advantageous embodiment:
R1, R2: independently, a hydrogen atom or CH$_3$,
R3: hydrogen,
R4, R5: CH$_3$,
Q: an alkyl chain comprising 2 or 3 carbons,
Z: oxygen or NH.

It has been found, surprisingly, that it is possible to obtain proppant properties that are superior to and more advantageous than those with the solutions of the prior art by using an amphoteric polymer based on at least one hydrophobic cationic monomer derived from acrylamide, based on at least one anionic monomer and based on at least one nonionic water-soluble monomer.

In particular, the fluids have improved rheological properties in that with a reduced dose of dissolved polymer, the fluids make it possible to achieve high levels of viscosity for shear rates of less than 20 s$^{-1}$ and low viscosities beyond 50 s$^{-1}$. They also have high yield viscosity values i.e. high viscosity plateau near the shear zero domain that are favourable for keeping proppants in suspension, thanks to the elastic property of the fluid.

The associative amphoteric polymer also allows to improve the suspending power of the proppants contained in the fracturing fluid. In other words, improves the suspension of the proppants over time.

Preferably, the associative polymers of the invention are in a dry form, as powder or as beads, or in a liquid form as inverse emulsion or aqueous dispersion (water in water emulsion).

According to a particular embodiment of the invention, the new aqueous composition of fracturing fluid can optionally comprise at least one surfactant, in small amounts. Indeed, it has been surprisingly noticed that the association of said associative amphoteric polymer with a small amount of surfactant improves the viscosifying properties. In a preferred embodiment, the new aqueous fracturing fluid composition comprises up to 500 ppm of at least one surfactant.

According to this particular embodiment, the surfactant is preferably not the viscoelastic surfactant of WO02/084075.

The fracturing fluid may also contain branching agents that react after injection, for instance:
  multivalent metal salts based on zirconium, aluminium or chromium,
  post-grafting agents, formaldehyde, glyoxal, polyethylenimines and ethyleneamines.

According to the invention, the polymer used is not crosslinked. Its structure may be linear, branched, star-shaped or comb-shaped. These structures may be obtained by free selection of the initiator, the transfer agents, the polymerization technique such as controlled radical polymerization, the incorporation of structural monomers, the concentration, etc.

For instance, branching agents that are capable of copolymerizing with the monomers and preferably monomers containing multiple polyethylenically unsaturations may be used (containing at least two unsaturated functions), for instance vinyl, allylic, acrylic and epoxy functions, and examples that may be mentioned include methylenebisacrylamide (MBA) and triallylamine.

The amphoteric associative polymers used in the invention are preferentially copolymers comprising:
  from 0.05 to 5 mol % of hydrophobic cationic monomer,
  from 5 to 54.95 mol % of at least one anionic monomer, advantageously acrylic acid and/or methacrylic acid and/or 2-acrylamido-2-methylpropanesulfonic acid and/or salts thereof,
  and from 45 to 90 mol % of at least one water-soluble nonionic monomer, advantageously acrylamide and/or N-isopropylacrylamide and/or N—N-dimethylacrylamide and/or N-tert-butylacrylamide and/or N-vinylformamide and/or N-vinylpyrrolidone and/or acryloylmorpholine and/or acryloylpyrrolidone.

The amphoteric associative polymers used in the invention are more preferentially polymers comprising:
  from 0.05 to 2 mol % of hydrophobic cationic monomer,
  from 5 to 24.95 mol % of at least one sulfonated anionic monomer such as 2-acrylamido-2-methylpropanesulfonic acid and salts thereof,
  from 0 to 30 mol % of an anionic carboxylate monomer such as acrylic acid and salts thereof,
  and from 45 to 90 mol % of at least one water-soluble nonionic monomer, such as acrylamide.

The hydrophobic cationic monomers derived from acrylics (acrylate or acrylamido) that are preferred in the invention are N-acrylamidopropyl-N,N-dimethyl-N-dodecylammonium chloride (DMAPA Cl(C12)), N-methacrylamidopropyl-N,Ndimethyl-N-dodecylammonium chloride (DMAPMA Cl(C12)), N-acrylamidopropyl-N,N-dimethyl-N-dodecylammonium bromide (DMAPA Br(C12)), N-methacrylamidopropyl-N,N-dimethyl-N-dodecylammonium bromide (DMAPMA Br(C12)), N-acrylamidopropyl-N,N-dimethyl-N-octadecylammonium chloride (DMAPA Cl(C18)), N-methacrylamidopropyl-N,N-dimethyl-N-octadecylammonium chloride (DMAPMA Cl(C18)), N-acrylamidopropyl-N,N-dimethyl-N-octadecylammonium bromide (DMAPA Br(C18)), N-methacrylamidopropyl-N,N-dimethyl-N-octadecylammonium bromide (DMAPMA Br(C18)), N-ethylhemimaleate, N,N-dimethyl N-decylammonium bromide, N-ethylacrylate, N,N-dimethyl, N-dodecylammonium bromide.

The Applicant has also developed a novel hydraulic fracturing process characterized by the injection of the said composition.

The composition of the fluid comprises at least one proppant, a viscosifying agent of polymeric type as described previously and water, advantageously a brine.

The term "brine" denotes an aqueous solution comprising an amount of inorganic salts. Examples that may be mentioned include sodium, magnesium or calcium salts and the chloride, sulfate, carbonate, etc. counterions thereof.

The proppant, such as sand, ceramic, bauxite, glass beads or resin-impregnated sand, represents from 0.5% to 40% by weight of the fluid, preferentially from 1% to 25% by weight of the fluid and even more preferentially from 1.5% to 20% by weight of the fluid.

The polymer of the present invention represents between 0.05% and 20%, preferentially from 0.1% to 1% and even more preferentially from 0.1% to 0.75% by weight of the fluid.

The aqueous composition may comprise other compounds known to those skilled in the art (as summarized in SPE 152596):
  clay inhibitor agents such as potassium chloride or choline chloride,
  biocides to avoid the development of bacteria, in particular sulfate-reducing bacteria, which may form viscous masses that reduce the passage areas. Glutaraldehyde is the most commonly used, or alternatively formaldehyde or isothiazolinones, can be used as well,
  oxygen scavenger agents such as ammonium bisulfite to avoid the destruction of the other components by oxidation and corrosion of the injection tubes, anticorrosion additives to protect the tubes against oxidation by the residual amounts of oxygen. N,N-Dimethylformamide is preferred, lubricants such as petroleum distillates, iron-chelating agents such as citric acid, EDTA or phosphonates, scale inhibitor products such as phosphates, phosphonates, polyacrylates or ethylene glycol, friction-reducing agents for reducing pressure drop in a turbulent medium and for greatly increasing the flow rate for an identical power and tube diameter.

The water-soluble polymers used in the invention do not require the development of a particular polymerization process. They may be obtained via any polymerization technique that is well known to those skilled in the art (solution polymerization, suspension polymerization, gel polymerization, precipitation polymerization, emulsion (aqueous or inverse) polymerization, optionally followed by a step of spray-drying, suspension polymerization, inverse suspension polymerization, micellar polymerization, optionally followed by a step of precipitation, post-hydrolysis or co-hydrolysis polymerization, radical "templates" polymerization or controlled radical polymerization.

The polymer is preferentially in powder, inverse emulsion or aqueous dispersion form. When it is in inverse emulsion or in aqueous dispersion form, it may be dissolved, either directly in brine or injection fluid, or using the method described in documents US 2011/0118153 which proposes the continuous online dissolution of inverse emulsions of water-soluble polymers.

When it is in powder form, this dissolution may take place, especially, by means of a unit as described in document WO 2008/107492, and sold by the Applicant under the reference PSU "Polymer Slicing Unit".

The compact and transportable installation described in patent application WO 2010/020698 is particularly suitable for fracturing operations.

A subject of the invention is also a process for fracturing an unconventional oil or gas reservoir, according to which:

the fracturing fluid as described previously is prepared, the fluid is injected under pressure so as to create fractures distributed perpendicularly to the production well.

Optionally, after the creation of the fractures, at least one oxidizing compound and/or at least one surfactant compound is injected into the reservoir. Advantageously, a great amount of at least one surfactant compound will be injected.

The injection of surfactant, in great amounts, allows a strong reduction of the viscosity generated by the polymer by disrupting the inter-chain hydrophobic interactions, while the injection of the oxidizing compounds destroys the polymer. In both cases, it is possible to re-establish a fluid viscosity close to that of water.

When a surfactant is injected after the fracturing process, its concentration is at least 500 ppm, preferably at least 1000 ppm, and even more preferably at least 2000 ppm.

Oxidizing compounds that may be mentioned include bleach, persulfates, permanganates and perchlorates. Delayed oxidizing compounds can be used as well.

The chemical nature of the surfactant compound(s) is not critical. They may be anionic, nonionic, amphoteric, zwitterionic and/or cationic. Preferably, the surfactant compound(s) of the invention contain anionic charges.

Preferably, the surfactant compounds used are chosen from anionic surfactants and zwitterions thereof chosen from the group comprising alkyl sulfate, alkyl ether sulfates, arylalkyl sulfate and arylalkyl ether sulfates, alkylsulfonates, alkyl ether sulfonates, arylalkylsulfonates, arylalkyl ether sulfonates, alkyl phosphates, alkyl ether phosphates, arylalkyl phosphates, arylalkyl ether phosphates, alkylphosphonates, alkyl ether phosphonates, arylalkylphosphonates, arylalkyl ether phosphonates, alkylcarboxylates, alkyl ether carboxylates, arylalkylcarboxylates, arylalkyl ether carboxylates, polyether alkyls, polyether arylalkyls, etc.

The term "alkyl chain" is defined as a branched or unbranched chain of 6 to 24 carbons, optionally comprising several moieties, which may optionally comprise one or more heteroatoms (O, N, S). The term "arylalkyl chain" defines a branched or unbranched chain of 6 to 24 carbons, comprising one or more aromatic rings and optionally comprising one or more heteroatoms (O, N, S).

The surfactants most commonly used, for reasons of cost, stability and availability, are of the sulfonate or sulfate type, which are in the form of alkali metal or ammonium salts.

The invention and the advantages resulting therefrom will emerge clearly from the following implementation examples, in support of the attached figures.

EXAMPLE 1

1/ Preparation of the Polymer by Gel Polymerization

In a beaker, dissolve x mole % of an acrylamide-derived hydrophobic cationic monomer, y mole % of acrylic acid, z mole % of acrylamide in water to obtain a 30% active ingredient content. The aforementioned additives may advantageously be added at this point to improve the solubilisation of the monomers. The sum of x+y+z is equal to 100. The solution is then stirred, cooled and neutralised by adding soda. The solution is then placed in a Dewar vessel and degassed with a nitrogen flow to remove the oxygen.

Polymerisation is initiated using a red/ox pair. The temperature rises adiabatically.

2/ Preparation of the Aqueous Polymer Solution

The dry extract of the polymer must be determined in order to know the percentage of active material: weigh accurately to within 0.001 g a glass vial. Note this mass $M_c$. Weigh out 10 g of powder in a glass vial and notes the cumulative mass $M_{c+p}$. Place this glass vial in an oven at 120° C. for 2 hours. After the 2 hours at 120° C., allow the vial to cool in a desiccator. Weigh the vial with the mass of dry recovered solid, noted $M_{c+ps}$. The percentage of dry matter X is given by the calculation:

$$X=[(M_{c+ps}-M_c)/(M_{c+p}-M_c)]*100 \text{ expressed as a percentage}$$

The polymer solution is prepared according to the following general protocol:

Preparation of a Stock Solution Containing 10 g/l of Polymer (Product of the Invention or Guar Gum in Powder Form)

Weigh out 200−(2/(X/100)) g of brine, representative of the injection water used on a fracturing field, in a 400 mL beaker. Using a mechanical stirrer, stir the solution at a speed of 500 rpm. 2/(X/100) g of dry polymer in powder form are added slowly in the vortex wall formed by the stirring at room temperature. The solution is left stirring for 2 hours.

Dilution of the Stock Solution to Obtain a Solution Diluted to a Final Polymer Concentration of Y %

Y*100 g of the 10 g/l stock solution are taken up by syringe and transferred into a 400 mL beaker. 100-Y g of brine prepared beforehand are added to beaker. The solution is then stirred using a magnetic bar at 250 rpm for 20 minutes.

3/ Rheological Evaluation of the Polymers

The guar gum samples evaluated are Ecopol™ 500 and GW 27. These products correspond to guar gums used on fracturing fields in the United States.

The polymers present in the fluid of the present invention are numbered from 1 to 4 and are described in the table below. For comparative purposes, a non-associative anionic polymer of very high molar mass is also evaluated: polymer 5, as well as an amphoteric and non-associative polymer as described in WO02/084075: polymer 6.

| Products | Acrylamide (mol %) | Sodium acrylate (mol %) | Sodium acrylamido-tert-butyl sulfonate (mol %) | Diallyl dimethyl Ammonium chloride (DADMAC) (mol %) | Associative monomer of $C_{12}H_{25}$ type (mol %) | Mw (millions g/mol) |
|---|---|---|---|---|---|---|
| Polymer 1 | 85 | 14.8 | 0 | 0 | 0.2 | 6-8 |
| Polymer 2 | 85 | 0 | 14.8 | 0 | 0.2 | 4-7 |
| Polymer 3 | 85 | 4.8 | 10 | 0 | 0.2 | 7-10 |
| Polymer 4 | 80 | 4.8 | 15 | 0 | 0.2 | 6-8 |
| Polymer 5 | 75 | 25 | 0 | 0 | 0 | 18-20 |
| Polymer 6 | 80 | 18 | 0 | 2 | 0 | 6-8 |

The rheological properties are determined using a Malvern Bohlin Gemini rheometer with cone/plate geometry of angle 2°, 6 cm in diameter. A Peltier heating and cooling system is used to be able to take measurements at different temperatures. The experimental conditions are described on each of the FIGS. 1 to 4.

The viscosities as a function of the shear rate at different temperatures are given in FIGS. 1 to 4. The target polymer concentration is 2000 ppm.

Figure 1:
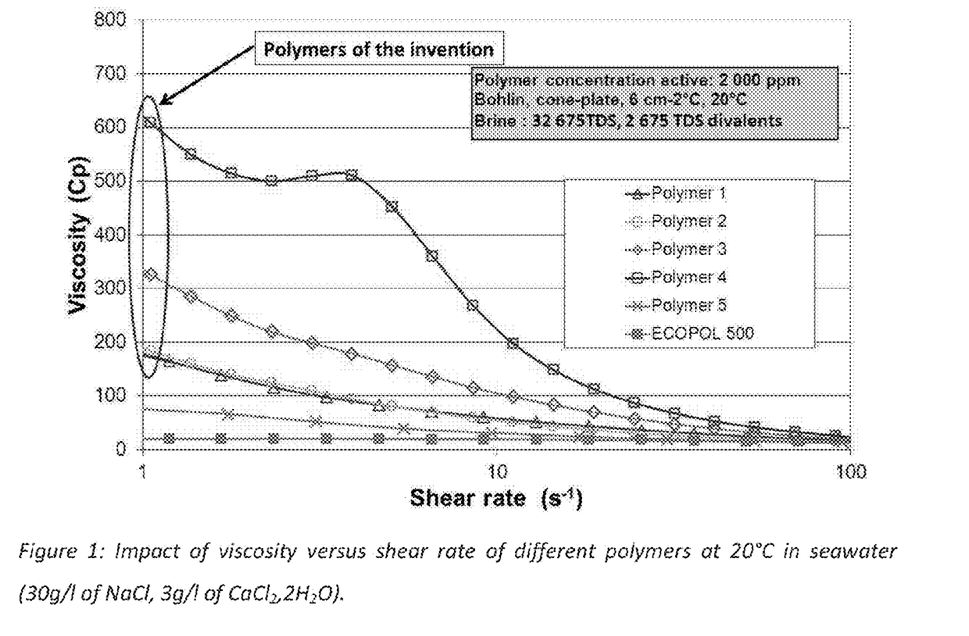
FIG. 1 is a graph comparing the viscosity in seawater of different prior art polymers relative to that of a polymer present in the fluid according to the invention as a function of the shear rate at 20° C.
Figure 2:
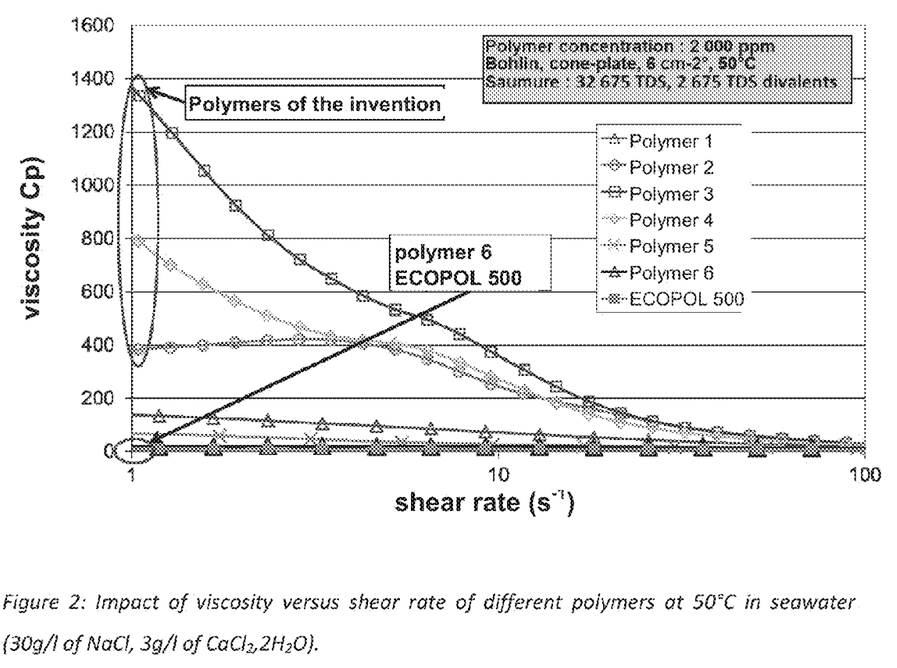
FIG. 2 is a graph comparing the viscosity in seawater of different prior art polymers relative to that of a polymer present in the fluid according to the invention as a function of the shear rate at 50° C.

Comments: It is noted that at 2000 ppm of polymer and at low shear, the polymers used in the present invention all develop a viscosity that is markedly higher than that of the test guar gum, at 20° C. and 50° C. This is particularly amplified for shears of less than 10 s$^{-1}$, which is the property sought for satisfactorily keeping the proppant in suspension. It is noted that beyond 50 s$^{-1}$, the viscosities are low for all the evaluated products, which ensures good pumping properties.

The use of a non-associative polymer, as well as the use of an amphoteric non-associative polymer, is not beneficial either.

Figure 3:
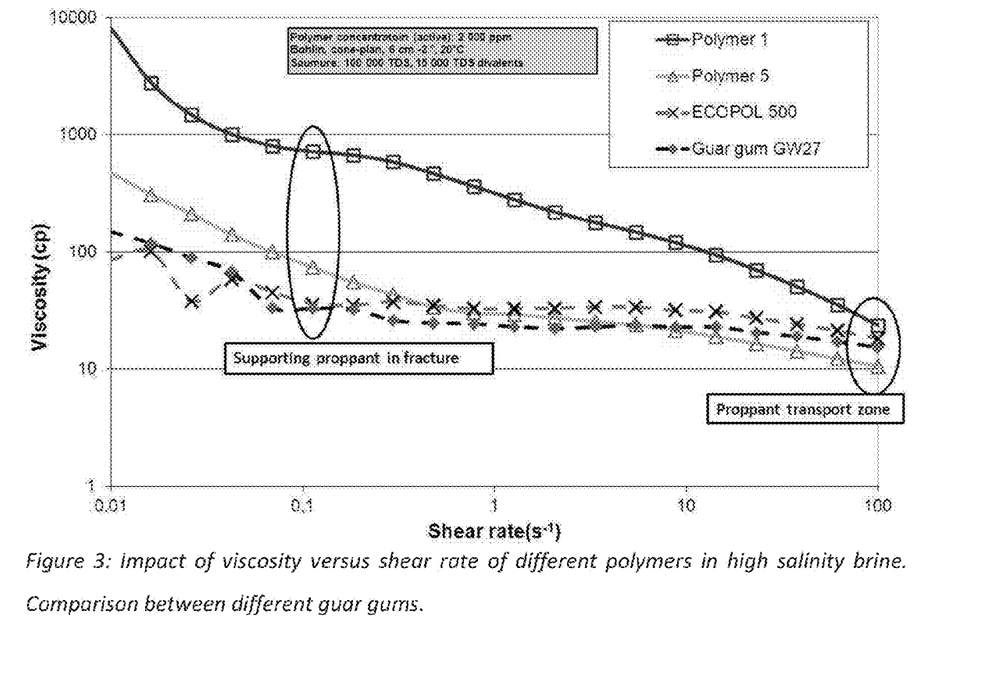
FIG. 3 is a graph comparing the viscosity in high salinity brine of various non-cross-linked guar gums relative to that of a polymer present in the fluid according to the invention as a function of the shear rate.

In contrast, and despite the high salinity, it is noted that the associative product used in the invention is 100 to 1000 times more viscous in the shear zone that is useful for the proppant suspension. The viscosity of the studied guar gums is virtually identical whatever the salinity of the brine.

Figure 4:
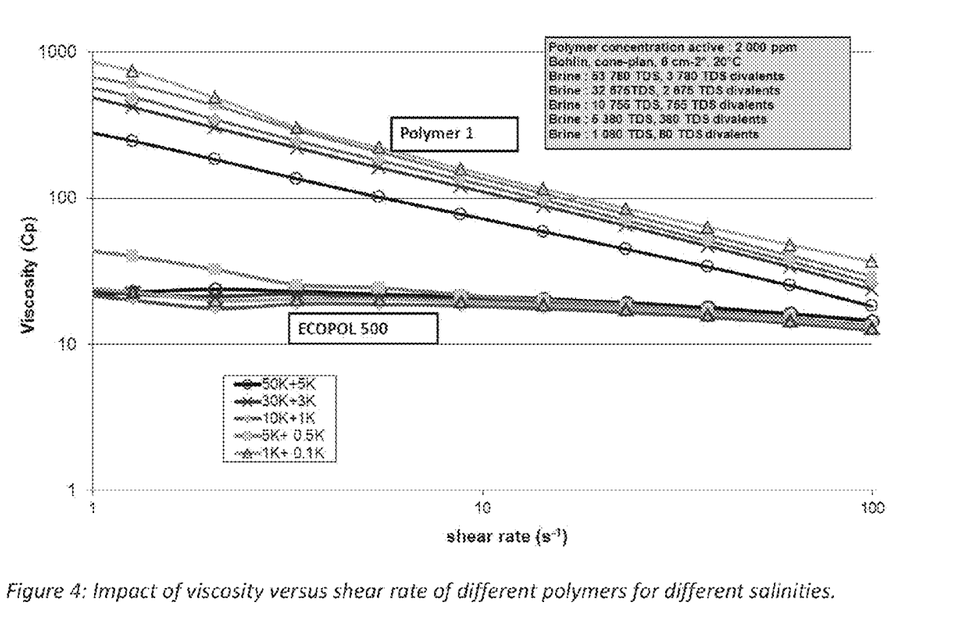
FIG. 4 is a graph comparing the viscosity in different salinities brine of a non-cross-linked guar gum relative to that of a polymer present in the fluid according to the invention as a function of the shear rate.

The polymer used in the invention has a higher viscosity than that of the test guar gum, whatever the salinity of the brine used. Whatever the salinity of the water used for the preparation of the stimulation fluid, the polymer used in the invention thus has better suspending power and in all cases maintains an improved suspending power, in particular at low shear.

Even at high salinity, the viscosity of the polymer used in the invention remains markedly above that of the other polymers tested.

EXAMPLE 2

Sand Sedimentation Test

Solutions of 230 g of polymer at 3000 ppm in synthetic seawater are prepared according to the protocol described previously. 20 g of sand used in the fracturing projects are added to each solution. The solutions are then stirred using a mechanical stirrer at 400 rpm for 5 minutes. Each solution is then transferred into a 250 mL measuring cylinder and a timer is started at the same time. The time corresponding to total sedimentation of the sand is recorded and is given in the table below.

| Products | Sedimentation time for the 20 g of sand |
|---|---|
| Ecopol 500 | Less than 2 minutes |
| Polymer 1 | 15 minutes |
| Polymer 2 | 20 minutes |
| Polymer 4 | 25 minutes |
| Polymer 6 | Less than 2 minutes |

The sand sedimentation times are much longer for the products of the invention than for guar gum. The products of the invention have much better sand-suspending power than guar gum.

Degradation of the Viscosity by Adding Surfactant after Fracturing

During the production step, once the sand has been inserted, the viscosity of the polymer must be lowered in order to facilitate the placing of the sand in the fractures. Generally, the injection of oxidizing agent is used to destroy the polymer and to re-establish a fluid viscosity close to that of water.

In order to demonstrate the impact of the surfactants on the polymer solutions in the presence of sand, the same sedimentation protocol was used. A 10% solution of surfactant (sodium dodecyl sulfate (SDS)) is added (5 g, i.e. 2000 ppm) with stirring 30 seconds before the transfer into the measuring cylinder. The time corresponding to total sedimentation of the sand is recorded and is given in the following table:

| Products | Sedimentation time for the 20 g of sand |
|---|---|
| Ecopol 500 | Less than 2 minutes |
| Polymer 1 + SDS | Less than 2 minutes |
| Polymer 2 + SDS | Less than 2 minutes |
| Polymer 4 + SDS | Less than 2 minutes |
| Polymer 6 | Less than 2 minutes |

It is noted by comparing this table with the preceding results that the addition of a sufficient quantity of SDS after fracturing drastically reduces the sand sedimentation time. It is thus advantageous to use the polymer of the present invention for its sand proppant properties, but also for the ease of subsequently reducing the viscosity of the solution by adding surfactant after fracturing.

EXAMPLE 3

Measure of the Viscosity of the Fracturing Fluid, after Addition of a Surfactant and Prior to Injection Polymer 1 is dissolved in an aqueous solution comprising water and 30 g/l NaCl. The concentration of the polymer is 5000 ppm.

Similar solutions have been prepared with polymers 3, 4, and 6.

The viscosity of each of these polymeric solutions has been measured with a Brookfield viscosimeter LVT at 20° C.

350 ppm of SDS are then added to each of the polymeric solutions.

The viscosity of each of these polymeric solutions containing SDS has been measured with a Brookfield viscosimeter LVT at 20° C.

After addition of SDS, the viscosity of the solutions containing polymers 1, 3, and 4 has increased by 250, 230, and 280% respectively. On the other hand, no change in viscosity has been noticed for the solution comprising the prior art polymer 6.

The invention claimed is:

1. A fracturing fluid comprising, in solution in water, a proppant and an associative amphoteric polymer, said polymer having a molecular weight of at least 1,000,000 g/mol, and comprising units derived from:
0.01 to 10 mol % of at least one cationic monomer containing a hydrophobic chain and of general formula I:

(I)

in which:
R1 and R2 are independently selected from hydrogen, $CH_3$, $CH_2COOH$, COOH, $CH_2COOR_7$, $COOR_7$, $CH_2CONR_7R_8$, and $CONR_7R_8$;
R3, R4, and R5 are independently selected from hydrogen, $CH_3$, and $C_2H_5$;
R6 is an alkyl or arylalkyl chain comprising from 8 to 30 carbons;
Q is an alkyl chain comprising from 1 to 8 carbons;
Z is oxygen or $NR_7$;
R7 and R8 are independently selected from hydrogen and an alkyl chain comprising from 1 to 8 carbons;
X is a halide selected from the group consisting of bromide, chloride, iodide, and fluoride, or a counterion of negative charge,
from 0.09 to 89.99 mol % of at least one anionic monomer; and
from 10 to 99 mol % of at least one nonionic water-soluble monomer.

2. The fracturing fluid according to claim 1, wherein the fluid comprises up to 500 ppm of at least one surfactant.

3. The fracturing fluid according to claim 1, wherein:
R1 and R2 are independently selected from a hydrogen atom and $CH_3$,
R3 is hydrogen,
R4 and R5 are $CH_3$,
Q is an alkyl chain comprising 2 or 3 carbons; and
Z is oxygen or NH.

4. The fracturing fluid according to claim 1, wherein the proppant is chosen from the group consisting of sand, ceramic, bauxite, glass beads and resin-impregnated sand.

5. The fracturing fluid according to claim 1, wherein the proppant represents from 0.5% to 40% of the fluid.

6. The fracturing fluid according to claim 1, wherein the polymer represents from 0.05% to 2% by weight of the fluid.

7. The fracturing fluid according to claim 1, wherein the cationic monomer is chosen from the group consisting of N-acrylamidopropyl-N,N-dimethyl-N-dodecylammonium chloride (DMAPA Cl(C12)), N-methacrylamidopropyl-N, Ndimethyl-N-dodecylammonium chloride (DMAPMA Cl(C12)), N-acrylamidopropyl-N,N-dimethyl-N-dodecylammonium bromide (DMAPA Br(C12)), N-methacrylamidopropyl-N,N-dimethyl-N-dodecylammonium bromide (DMAPMA Br(C12)), N-acrylamidopropyl-N,N-dimethyl-N-octadecylammonium chloride (DMAPA Cl(C18)), N-methacrylamidopropyl-N,N-dimethyl-N-octadecylammonium chloride (DMAPMA Cl(C18)), N-acrylamidopropyl-N,N-dimethyl-N-octadecylammonium bromide (DMAPA Br(C18)), N-methacrylamidopropyl-N,N-dimethyl-N-octadecylammonium bromide (DMAPMA Br(C18)), N-ethylhemimaleate, N,N-dimethyl N-decylammonium bromide, N-ethylacrylate, N,N-dimethyl, and N-dodecylammonium bromide.

8. The fracturing fluid according to claim 1, wherein the anionic monomers are chosen from the group consisting of acrylic acid, methacrylic acid, itaconic acid, crotonic acid, maleic acid, fumaric acid, 2-acrylamido-2-methylpropanesulfonic acid, vinylsulfonic acid, vinylphosphonic acid, allylsulfonic acid, allylphosphonic acid, and styrenesulfonic acid and the water-soluble alkali metal, alkaline-earth metal and ammonium salts thereof.

9. The fracturing fluid according to claim 1, wherein the nonionic monomers are chosen from the group consisting of acrylamide and methacrylamide, N-isopropylacrylamide, N,N-dimethylacrylamide, N-tert-butylacrylamide, N-vinylformamide, N-vinylacetamide, N-vinylpyridine and/or N-vinylpyrrolidone, acryloylmorpholine, acryloylpyrrolidone, and alkyl-polyethylene glycol methacrylates.

10. The fracturing fluid according to claim 1, wherein the polymer comprises:
from 0.05 to 5 mol % of hydrophobic cationic monomer,
from 5 to 54.95 mol % of at least one anionic monomer, and from 45 to 90 mol % of at least one water-soluble nonionic monomer.

11. The fracturing fluid according to claim 1, wherein the polymer comprises:
from 0.05 to 2 mol % of hydrophobic cationic monomer,
from 5 to 24.95 mol % of at least one sulfonated anionic monomer
from 0 to 30 mol % of an anionic carboxylate monomer, and
from 45 to 90 mol % of at least one water-soluble nonionic monomer.

12. A process for fracturing an unconventional oil or gas reservoir, wherein:
the fracturing fluid according to claim 1 is prepared, and
the fluid is injected under pressure so as to create fractures distributed perpendicularly to the production well.

13. The process according to claim 12, wherein at least one oxidizing compound and/or at least one surfactant is then injected into the reservoir.

14. The fracturing fluid according to claim 5, wherein the proppant represents from 1% to 25% of the fluid.

15. The fracturing fluid according to claim 14, wherein the proppant represents from 1.5% to 20% by weight of the fluid.

16. The fracturing fluid according to claim 6, wherein the polymer represents from 0.1% to 1% by weight of the fluid.

17. The fracturing fluid according to claim 16, wherein the polymer represents from 0.1% to 0.75% by weight of the fluid.

18. The fracturing fluid according to claim 10, wherein:
the at least one anionic monomer is selected from acrylic acid, methacrylic acid, and 2-acrylamido-2-methylpropanesulfonic acid, and salts thereof; and
the at least one water-soluble nonionic monomer is selected from acrylamide, N-isopropylacrylamide, N—N-dimethylacrylamide, N-tert-butylacrylamide, N-vinylformamide, N-vinylpyrrolidone, acryloylmorpholine, and acryloylpyrrolidone.

19. The fracturing fluid according to claim 11, wherein:
the at least one sulfonated anionic monomer is 2-acrylamido-2-methylpropanesulfonic acid or a salt thereof,
the anionic carboxylate monomer is acrylic acid or a salt thereof, and
the at least one water-soluble nonionic monomer is acrylamide.

20. The fracturing fluid according to claim 11, wherein:
R1 and R2 are independently selected from a hydrogen atom and $CH_3$,
R3 is hydrogen,
R4 and R5 are $CH_3$,
Q is an alkyl chain comprising 2 or 3 carbons; and
Z is oxygen or NH.

* * * * *